(12) United States Patent
Kim et al.

(10) Patent No.: US 10,837,094 B2
(45) Date of Patent: Nov. 17, 2020

(54) ALUMINUM-BASED ALLOY PLATED STEEL SHEET HAVING EXCELLENT PROCESSING PART CORROSION RESISTANCE

(71) Applicant: POSCO, Pohang-si (KR)

(72) Inventors: Heung-Yun Kim, Gwangyang-si (KR); Young-Ha Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/471,920

(22) PCT Filed: Dec. 22, 2017

(86) PCT No.: PCT/KR2017/015415
§ 371 (c)(1),
(2) Date: Jun. 20, 2019

(87) PCT Pub. No.: WO2018/117770
PCT Pub. Date: Jun. 28, 2018

(65) Prior Publication Data
US 2019/0382877 A1 Dec. 19, 2019

(30) Foreign Application Priority Data

Dec. 23, 2016 (KR) .................. 10-2016-0177538

(51) Int. Cl.
*C23C 2/12* (2006.01)
*B32B 15/01* (2006.01)
(Continued)

(52) U.S. Cl.
CPC .............. *C23C 2/12* (2013.01); *B32B 15/012* (2013.01); *C21D 8/0205* (2013.01);
(Continued)

(58) Field of Classification Search
None
See application file for complete search history.

(56) References Cited

U.S. PATENT DOCUMENTS

| 6,649,282 B1 | 11/2003 | Yamaguchi et al. |
| 2009/0053556 A1 | 2/2009 | Sohn et al. |

(Continued)

FOREIGN PATENT DOCUMENTS

| EP | 2746422 | 6/2014 |
| EP | 3266900 | 1/2018 |

(Continued)

OTHER PUBLICATIONS

International Search Report—PCT/KR2017/015415 dated Mar. 29, 2018.

(Continued)

*Primary Examiner* — Daniel J. Schleis
(74) *Attorney, Agent, or Firm* — Cantor Colburn LLP

(57) ABSTRACT

Provided is an aluminum-based alloy plate steel sheet, which comprises a base steel sheet, an interfacial alloy layer, and an aluminum-based plated layer comprising a Mg—Si-based alloy phase, and in which b/a is 1-5 when the area fraction of the Mg—Si-based alloy phase contained in the aluminum-based plated layer is a and the area fraction of the Mg—Si-based alloy phase contained in the region of the lower 20% in the thickness direction of the aluminum-based plated layer is b.

10 Claims, 2 Drawing Sheets

(51) Int. Cl.
*C21D 8/02* (2006.01)
*C21D 9/46* (2006.01)
*C22C 21/02* (2006.01)
*C22C 21/06* (2006.01)
*C22C 38/04* (2006.01)
*C23C 2/40* (2006.01)
*C23C 2/14* (2006.01)

(52) U.S. Cl.
CPC ......... *C21D 8/0226* (2013.01); *C21D 8/0236* (2013.01); *C21D 8/0263* (2013.01); *C21D 9/46* (2013.01); *C22C 21/02* (2013.01); *C22C 21/06* (2013.01); *C22C 38/04* (2013.01); *C23C 2/14* (2013.01); *C23C 2/40* (2013.01); *Y10T 428/12757* (2015.01)

(56) References Cited

U.S. PATENT DOCUMENTS

| | | | |
|---|---|---|---|
| 2013/0186524 A1 | 7/2013 | Kwak et al. | |
| 2013/0295409 A1 | 11/2013 | Chin et al. | |

FOREIGN PATENT DOCUMENTS

| | | |
|---|---|---|
| JP | 05295513 | 11/1993 |
| JP | 2000282204 | 10/2000 |
| JP | 2000328216 | 11/2000 |
| JP | 2001131725 | 5/2001 |
| JP | 2010168645 | 8/2010 |
| JP | 2012007245 | 1/2012 |
| JP | 2013122075 | 6/2013 |
| JP | 2014501852 | 1/2014 |
| JP | 2014507559 | 3/2014 |
| JP | 2016166414 | 9/2016 |
| KR | 20070067593 | 6/2007 |
| KR | 20120048399 | 5/2012 |
| KR | 20120065464 | 6/2012 |
| KR | 20140029496 | 3/2014 |
| KR | 20140066020 | 5/2014 |
| KR | 20150073887 | 7/2015 |
| WO | 2009111842 | 9/2009 |
| WO | 2013008341 | 1/2013 |
| WO | 2016140370 | 9/2016 |

OTHER PUBLICATIONS

European Search Report—European Application No. 17882328.2 dated Jan. 21, 2020, citing WO 2016/140370, EP 3266900, JP 2016-166414, EP 2746422, and WO 2009/111842.

Japanese Office Action-Japanese Application No. 2019-533533 dated Aug. 25, 2020, citing JP 2012-007245, JP 2014-501852, WO 2016/140370, JP 2010-168645, JP 2016-166414, WO 2013/008341, JP 05-295513, JP 2013-122075, WO 2009/111842, and KR 10-2014-0029496.

'A'

'A' ved as below.
ALUMINUM-BASED ALLOY PLATED STEEL SHEET HAVING EXCELLENT PROCESSING PART CORROSION RESISTANCE

TECHNICAL FIELD

The present disclosure relates to an aluminum-based alloy plated steel sheet having excellent corrosion resistance in a processed part, and more particularly, to an aluminum-based alloy plated steel sheet having excellent corrosion resistance in a processed part, used as a material for structural members, such as exhaust system members, building materials, automobile bodies, and the like.

BACKGROUND ART

To improve the fuel efficiency of automobiles, weight reduction of automobiles has emerged as a very important issue. To meet this demand, many kinds of automotive high strength steels have been developed. Most steel plates have an inverse proportional relationship in which the ductility is decreased when the strength is increased. Thus, a lot of studies have been undertaken to improve the ductility of high strength steels, so that manganese in the steel is composed of 5 to 35% and twinning is thus induced during plastic deformation to obtain austenitic Twinning Induced Plasticity (TWIP) steel having significantly improved ductility.

However, manganese has a high ionization tendency, and in the case of steel having a high content of manganese, the corrosion proceeds faster than that of general steel. Of the various methods of protecting steel against corrosion, metal plating may be effective.

In relation to this, Patent Document 1 discloses a high manganese molten zinc-based plated steel sheet in which a hot-dip galvanized layer or a galvannealed hot-dip galvanized layer is formed on the surface of a high-manganese steel. However, in the case of such a high manganese molten zinc-based plated steel sheet, molten zinc in the liquid phase penetrates into the grain boundaries of high manganese steel, a basis material, in a heat affected zone (HAZ) during spot welding, thereby causing cracks and liquid metal embrittlement (LME), as well as brittle fractures.

To solve the problem of lowering such weldability, attempts have been made to form an aluminum-based plated layer on the surface of high manganese steel. However, in the case of aluminum-based plating, cracking and scratches occur due to the absence of sacrificial corrosion resistance, and the aluminum-based plating cannot be commercialized due to the problem of not protecting base steel exposed externally. For reference, Patent Document 2 discloses that, when Mg is added to a plating layer to form a $Mg_2Si$ phase, the corrosion resistance of a machined part may be improved. However, this technique is also insufficient for the protection of high manganese steel with high processing strain.

PRIOR ART DOCUMENTS

Patent Documents (Patent Document 1) Korean Patent Laid-Open Publication No. 10-2007-0067593

(Patent Document 2) Japanese Patent Laid-Open Publication No. 2000-282204

DISCLOSURE

Technical Problem

An aspect of the present disclosure is to provide an aluminum-based alloy plated steel sheet having excellent processed part corrosion resistance.

Technical Solution

According to an aspect of the present disclosure, an aluminum-based alloy plated steel sheet includes a base steel sheet; an interfacial alloy layer; and an aluminum-based plated layer including a magnesium-silicon (Mg—Si)-based alloy phase. When an area ratio of the Mg—Si based alloy phase contained in the aluminum-based plated layer is a and an area ratio of a Mg—Si based alloy phase contained in a region of a lower 20% of the aluminum-based plated layer in a thickness direction is b, b/a is 1 to 5.

Advantageous Effects

According to an embodiment of the present disclosure, an aluminum-based alloy plated steel sheet may have excellent corrosion resistance in a processed part, and thus, may be used as a material for structural members, such as exhaust system members, building materials, automobile bodies, and the like.

The various and advantageous advantages and effects of the present disclosure are not limited to the above description, and may be more easily understood in the course of describing a specific embodiment of the present disclosure.

BEST MODE FOR INVENTION

The present inventors have intensively studied for the purpose of maximizing the corrosion resistance of a processed part of the aluminum-based alloy plated steel sheet having a high manganese steel as a basis material, and found that, when Mg and Si are added to an aluminum-based plated layer to form a Mg—Si based alloy phase and the distribution, position, hardness, and the like of the Mg—Si based alloy phase are appropriately controlled, the corrosion resistance on the processed part may be significantly improved. Therefore, the present disclosure may be provided as below.

Figure 1:
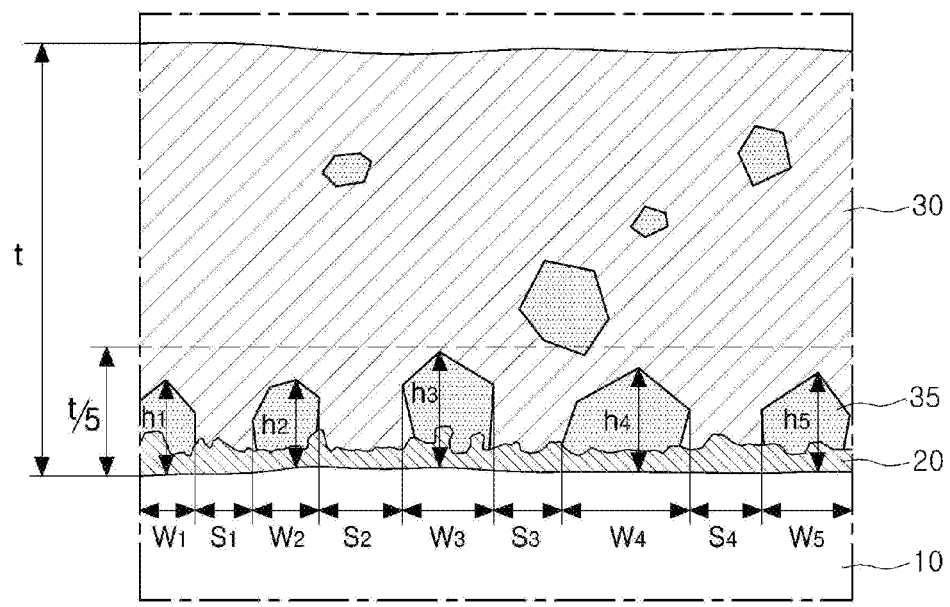
FIG. 1 is a schematic cross-sectional view of an aluminum-based alloy plated steel sheet according to an embodiment in the present disclosure.

FIG. 1 is a schematic cross-sectional view of an aluminum-based alloy plated steel sheet according to an embodiment in the present disclosure. Hereinafter, with reference to FIG. 1, an aluminum-based alloy plated steel sheet having excellent corrosion resistance on a processed part according to an embodiment in the present disclosure will be described in detail. The dimensions of respective parts to be described below may be obtained by cutting the plated steel sheet in the thickness direction and observing the cross section using an SEM.

An aluminum-based alloy plated steel sheet according to an embodiment in the present disclosure includes a base steel sheet 10, an interfacial alloy layer 20, and an aluminum-based plated layer 30 including an Mg—Si based alloy phase 35. In this case, according to an example which is not limited, the Mg—Si based alloy phase 35 may refer to an $Mg_2Si$ phase.

In general, it is known that, in a case in which Mg and Si are added to a molten aluminum-based plating bath in an appropriate amount, an Mg—Si based alloy phase is formed in a plating layer in a solidification process of the plating layer. Such an Mg—Si based alloy phase is known to have various sizes and to be scattered irregularly in the plating layer without showing a distribution position.

In contrast, according to an embodiment in the present disclosure, as significantly important characteristics herein, the majority of Mg—Si based alloy phases are in contact with the interfacial alloy layer 20 or are present in the vicinity of the interfacial alloy layer 20. In more detail, b/a is 1 to 5 when an area ratio of the Mg—Si based alloy phase contained in the aluminum-based plated layer is a and the area ratio of an Mg—Si based alloy phase contained in a region of a lower 20% of the aluminum-based plated layer in a thickness direction is b.

As a result of the research conducted by the inventors of the present disclosure, when the b/a is controlled to be an appropriate level or more, the Mg—Si based alloy phase near an exposed portion of the base steel sheet is immediately dissolved when the base steel sheet is exposed externally due to cracks, scratches or the like, to protect the exposed portion of the base steel sheet, thereby suppressing corrosion of the exposed portion of the base steel sheet. To obtain such an effect according to an embodiment in the present disclosure, it is necessary to control b/a to be 1 or more, in detail, to be 1.1 or more. On the other hand, as the b/a value is increased, corrosion resistance of a processed part may be further improved. However, if the b/a value is excessively great, the effect of corrosion resistance is saturated and the Mg—Si based alloy phase is harder than a surrounding structure, thereby causing peeling of a plating layer. Considering this, b/a may be controlled to be 5 or less. On the other hand, referring to FIG. 1, a is a value obtained by dividing the sum of areas of nine Mg—Si based alloy phases 35 by $t \times (W_1+S_1+W_2+S_2+W_3+S_3+W_4+S_4+W_5)$, and b is a value obtained by dividing the sum of areas of five Mg—Si based alloy phases below the dotted line and an area of a portion of one Mg—Si based alloy phase located on the dotted line, by $t \times (W_1+S_1+W_2+S_2+W_3+S_3+W_4+S_4+W_5)$, the portion being located below the dotted line.

As described above, at least portions of the Mg—Si based alloy phases are formed to be in contact with the interfacial alloy layer. According to an embodiment, in the case of the Mg—Si based alloy phases formed in contact with the interfacial alloy layer, when c is the sum of lengths of the Mg—Si based alloy phases projected through an interface between the base steel sheet and the interfacial alloy layer and d is a length of an interface between the base steel sheet and the interfacial alloy layer, c/d may be 0.2 to 0.8. If c/d is less than 0.2, the Mg—Si based alloy phases are excessively separated from the base steel sheet, which may result in insufficient protective effect. On the other hand, if c/d is more than 0.8, the effect may be saturated and an additional corrosion resistance effect may not be expected, and furthermore, since the Mg—Si based alloy phases serve to propagate plating cracks such that plating adhesion may be deteriorated. On the other hand, referring to FIG. 1, c refers to $(W_1+W_2+W_3+W_4+W_5)$, and d refers to $(W_1+S_1+W_2+S_2+W_3+S_3+W_4+S_4+W_5)$.

According to an example, an average hardness of the Mg—Si based alloy phases formed in contact with the interfacial alloy layer may be 400 to 600 Hv. Since an Al structure, which is the base structure of the aluminum-based plated layer 30, has a relatively low hardness and the hardness of the interfacial alloy layer is significantly high, cracks may propagate from the interfacial alloy layer 20 to the aluminum-based plated layer 30 during processing. In this case, the Mg—Si based alloy phases formed in contact with the interfacial alloy layer serve as intermediate buffering, thereby suppressing propagation of cracks. If the average hardness of the Mg—Si based alloy phases formed in contact with the interfacial alloy layer is less than 400 Hv, the buffering function may be insufficient. On the other hand, if the average hardness exceeds 600 Hv, the Mg—Si based alloy phases may act as a crack generation point.

According to an example, in the case of the Mg—Si based alloy phases formed in contact with the interfacial alloy layer, when an average of lengths thereof projected through an interface between the base steel sheet and the interfacial alloy layer is e and an average height of the Mg—Si based alloy phases formed in contact with the interfacial alloy layer is f, f/e may be 0.2 to 3. If f/e is less than 0.2, a long-term corrosion resistance effect may not be expected. On the other hand, if the f/e is more than 3, the Mg—Si based alloy phases formed in contact with the interfacial alloy layer may act as paths through which plating cracks propagate. On the other hand, referring to FIG. 1, e may refer to $(W_1+W_2+W_3+W_4+W_5)/5$, and f may refer to $(h_1+h_2+h_3+h_4+h_5)/5$.

According to an example, when an average interval of the Mg—Si based alloy phases formed in contact with the interfacial alloy layer is g and an average thickness of the aluminum-based plated layer is t, Equation 1 may be satisfied. When the Mg—Si based alloy phases formed in contact with the interfacial alloy layer are uniformly and closely distributed, corrosion resistance of a processed part may be further improved. If g is greater than t, there is a risk of not effectively protecting the processed part of the base steel plate. On the other hand, if g is less than t/5, there is a fear that the Mg—Si based alloy phases may serve as paths on which plating cracks propagate. Referring to FIG. 1, g may refer to $(S_1+S_2+S_3+S_4)/4$.

$$t/5 \leq g \leq t \qquad \text{Equation 1}$$

Each of the base steel sheet 10, the interfacial alloy layer 20 and the aluminum-based plated layer 30, constituting the aluminum-based alloy plated steel sheet according to an embodiment in the present disclosure as described above, may have various compositions and thicknesses. Thus, the alloy composition, the content range and the thickness thereof are not particularly limited. However, as a detailed example, the base steel sheet 10, the interfacial alloy layer 20 and the aluminum-based plated layer 30 may have the following alloy components, content ranges and thicknesses. It is to be noted that the content of each component described below is based on weight, unless otherwise specified.

The base steel sheet 10 may contain 5 to 35 wt % of Mn.

Mn is an indispensable element in high manganese steel to significantly improve ductility simultaneously with an increase in the strength of steel, by allowing twinning to be induced during plastic deformation due to stabilization of the austenite phase. In the process of forming the interfacial alloy layer between the base steel sheet and the plating layer, Mn may act as a manganese (Mn) supply source. To obtain such an effect, Mn may be added in an amount of at least 5% or more. However, if the Mn content exceeds 35%, cracks occur in a casting process due to lowered ductility at high temperature, and high-temperature oxidation occurs rapidly in the reheating process for hot rolling, thereby lowering the surface quality of a product and increasing manufacturing costs due to addition of a large amount of Mn. Thus, the addition amount of Mn is limited to 35% or less.

On the other hand, the base steel sheet may contain alloying elements such as C, Si, Al, Ti, V, B, Cr, Mo, Nb, Sb, Sn and the like, depending on various requirements such as a manufacturing process and improvement of physical properties. These alloying elements do not significantly affect the formation and distribution of the Mg—Si based alloy phase. Therefore, according to an embodiment in the present disclosure, the content range of these alloying elements is not particularly limited. On the other hand, in addition to the above composition, a remainder thereof is comprised of Fe and unavoidable impurities.

The aluminum-based plated layer 30 may include, by weight %, 3 to 15% of Si, 0.1 to 10% of Mg, a remainder of Al, and unavoidable impurities.

Si: 3 to 15%

Si serves to improve workability and oxidation resistance. To obtain such effects in an embodiment of the present disclosure, the Si content may be controlled to be 3% or more. However, if the content thereof exceeds 15%, there is a problem in which the plating bath temperature is excessively increased or a coarse Si primary crystal is crystallized.

Mg: 0.1 to 10%

Mg serves to improve corrosion resistance and reduce unplating. To obtain such an effect according to an embodiment in the present disclosure, the Mg content may be controlled to be 0.1% or more. However, of the content thereof exceeds 10%, the effect is saturated and the cost is increased.

In addition to the above composition, a remainder thereof is Al. In addition, inevitable impurities that are not intended may be mixed from a raw material or a surrounding environment in a general manufacturing process, which may not be excluded. These impurities are known to those skilled in the art and thus, are not specifically referred to in this specification. On the other hand, addition of other effective components is not excluded in addition to the above-mentioned composition. For example, one or more of 0.001 to 5% of Ca, 0.005 to 2% of Sr, 0.01 to 2% of Mn, 0.01 to 2% of Cr, 0.01 to 2% of Mo, and 0.1 to 10% of Sn may be further included. In this case, the corrosion resistance of the aluminum-based alloy plated steel sheet may be further improved.

According to an embodiment in the present disclosure, the thickness or the adhesion amount of the aluminum-based plated layer 30 are not particularly limited. As the adhesion amount of the aluminum-based plated layer 30 increases, it is advantageous in terms of long-term corrosion resistance. However, in this case, since the thickness of the interfacial alloy layer increases, the workability is deteriorated and the manufacturing cost is increased due to the increase of the raw material cost. Considering these points, the thickness or the adhesion amount thereof may be properly determined.

The interfacial alloy layer 20 is formed on an interface between the base steel sheet 10 and the aluminum-based plated layer 30, and may include, by weight %, 40 to 70% of Al, 3 to 10% of Mn, 2 to 13% of Si, a remainder of Fe, and unavoidable impurities. For reference, the composition of the interfacial alloy layer may be easily identified through EPMA, SEM-EDX, elemental analysis such as ICP after wet-melting, and the like.

Al: 40 to 70%

When forming the interfacial alloy layer, aluminum in the base steel sheet and aluminum in the plating layer participate in the reaction. As the aluminum content in the base steel sheet increases, the aluminum content in the interfacial alloy layer tends to increase. As the content of aluminum in the interfacial alloy layer decreases, the workability may be improved. As the content of aluminum in the interfacial alloy layer increases, the homogeneity of the interfacial alloy layer may be improved. Therefore, the aluminum content may be set to 40% or more in consideration of the homogeneity of the interfacial alloy layer, and may be set to 70% or less in consideration of processability.

Mn: 3 to 10%

Manganese which participates in the reaction when forming the interfacial alloy layer is manganese contained in the base steel sheet. The reaction between iron and manganese tends to be slower than an iron-aluminum reaction. The manganese content in the interfacial alloy layer tends to change insensitive to the change of the manganese content in the base steel sheet. As the content of manganese in the interfacial alloy layer increases, the workability may be improved. However, if the manganese content is too high, a phase unfavorable for workability is produced. Therefore, the manganese content in the interfacial alloy layer is limited to at least 3% or more and 10% or less in consideration of workability.

Si: 2 to 13%

To suppress the growth of the interfacial alloy layer, 3 to 15% of Si is added to the aluminum-based plating bath. Si inhibits the iron-aluminum reaction by a reaction of iron-silicon in the formation of an alloy layer, and the Si content in the plating bath affects the processability of the plating layer. The Si content in the interfacial alloy layer is affected by the Si content in the plating bath, the reaction temperature and time, and the like. Therefore, when the interfacial alloy layer is effectively suppressed, the Si content is 2% or more, and the Si content is limited to 13% because the additional effect may not be obtained even in a case in which the Si content exceeds 13%.

In addition to the above composition, the remainder is Fe. However, in an ordinary manufacturing process, impurities which are not intended may be inevitably incorporated from a raw material or a surrounding environment, which cannot be excluded. These impurities are known to those skilled in the manufacturing field, and thus, are not specifically mentioned in this specification.

According to an embodiment in the present disclosure, the thickness of the interfacial alloy layer 20 is not particularly limited. However, if the thickness of the interfacial alloy layer 20 is too thin, it may be disadvantageous from the viewpoint of plating adhesion, whereas if it is too thick, it may be disadvantageous in view of processability. In consideration of this, the thickness of the interfacial alloy layer 20 may be 0.1 to 10 μm. On the other hand, referring to FIG. 1, the thickness of the interfacial alloy layer 20 may be a value obtained by dividing the area of the interfacial alloy layer by $(W_1+S_1+W_2+S_2+W_3+S_3+W_4+S_4+W_5)$.

The aluminum-based alloy plated steel sheet according to an embodiment in the present disclosure described above may be produced by various methods. The production method thereof is not particularly limited, but as a detailed example, the following production method may be used.

According to the results of research conducted by the inventors of the present disclosure, to enable most of the Mg—Si based alloy phases to be in contact with the interfacial alloy layer 20 or to be present in the vicinity of the interfacial alloy layer 20, control of components and roughness of the interfacial alloy layer 20, cooling rate after plating, and the like are required.

(1) Component of Interfacial Alloy Layer

Appropriate control of the Mn content is required among the components of the interfacial alloy layer. It is presumed that Mn is a metal having properties similar to Fe and promotes the growth of the interfacial alloy phase when the base steel sheet and the molten aluminum-based plating solution react with each other. The Mn content in the interfacial alloy layer may be controlled by controlling the Mn content in the base steel sheet or by adding a small amount of Mn in the plating layer. In detail, the content range of Mn in the interfacial alloy layer is as described above.

(2) Roughness of Interfacial Alloy Layer

When unevenness is formed on the interfacial alloy layer, nuclei of the Mg—Si based alloy phases are preferentially generated near the interfacial alloy layer, which is presumably because the heat of the aluminum-based plated layer is more easily transferred to the base steel sheet in a relatively more amount when unevenness is formed on the interfacial alloy layer.

In an embodiment of the present disclosure, a detailed method of forming the unevenness on the interfacial alloy layer is not particularly limited. For example, a method of forming fine unevenness on the surface of the base steel sheet before plating to promote heterogeneous nucleation, a method of non-uniformly distributing foreign matter on the surface of the base steel sheet before plating, a method of rapidly forming the interfacial alloy layer by controlling the temperature of the base steel sheet immediately before immersion thereof in the plating bath to be a somewhat lower temperature than that of the plating bath, or the like may be used.

For example, to promote the formation of heterogeneous nucleation by the formation of fine unevenness, the surface roughness may be effectively controlled to be 0.1 to 0.5 μm in consideration of the very small nucleation position.

As the method of non-uniformly distributing the foreign matter on the surface of the base steel sheet, there is a method of plating a very small amount of elements such as Ni, Zn, Fe and the like for a very short period of time, and when the adhesion amounts thereof are about 10 to 100 mg/m$^2$, the effect of fine unevenness formation may be effectively obtained.

When the temperature of the base steel sheet immediately before immersion into the plating bath is lower than the plating bath temperature, an alloying reaction with the molten aluminum rapidly occurs on the surface of the base steel sheet introduced into the plating bath, thereby forming fine unevenness on the interfacial alloy layer. When the temperature difference therebetween may be about 10 to 20° C., the formation of fine unevenness may be effective.

(3) Cooling Rate after Plating

The cooling rate after plating has a great influence on the position distribution of the Mg—Si based alloy phases. To secure the target structure according to an embodiment in the present disclosure, slow cooling is performed only within the crystallization temperature range of the Mg—Si based alloy phases, to prevent a surface layer portion of the plating layer from being formed. In this case, outside the crystallization temperature range of the Mg—Si based alloy phase, it is necessary to induce the solidification of a remaining liquid-phase plating layer on the surface layer portion of the plating layer having a relatively low temperature by relative quenching. The crystallization temperature range of the Mg—Si based alloy phase changes depending on the composition system, and is about 556° C. to 1085° C. Within the composition range according to an embodiment in the present disclosure, the crystallization temperature range of the Mg—Si based alloy phase is from about 556° C. to 640° C. As a result of the inventors' research, in a case in which the crystallization temperature of the Mg—Si based alloy phase is 640° C., slow cooling is performed within the temperature range from 640° C. to 610° C. (for example, a range from the crystallization temperature to a lower temperature of about 20 to 40° C.) at a rate of 5° C./sec or less, and then, quenching is performed at a rate of 10° C./sec or more within the subsequent temperature range, which may be advantageous to secure the positional distribution of the required Mg—Si based alloy phase.

MODE FOR INVENTION

Hereinafter, embodiments in the present disclosure will be described in more detail. However, the description of these embodiments is intended only to illustrate the practice in the present disclosure, but embodiments are not limited thereto. The scope of the present disclosure is determined by the matters described in the claims and the matters reasonably deduced therefrom.

Embodiment

A steel slab having an Mn content as shown in Table 1 below (except for Mn, in all slabs, 0.76% of C, 0.65% of Si, 0.013% of P, 0.0050% of S, 0.25% of Cr, 2.28% of Al, and 0.08% of Ti were included, and the content ranges of respective components were controlled were adjusted so that there was no significant difference) was prepared. The steel slab was subjected to hot rolling by heating to a temperature of about 1200° C., and in detail, was subjected to hot finish rolling at 860° C., and then to being coiled and air-cooled at 620° C. Then, the oxide on the surface of the steel sheet was removed with an HCl solution, and was then cold-rolled at a reduction ratio of 70% to prepare a cold-rolled steel sheet having a thickness of 1.2 mm. Thereafter, the cold-rolled steel sheet was degreased and the surface thereof was polished by sandpaper to adjust roughness to 0.3 μm, to then be annealed in an N$_2$–10 vol % H$_2$ atmosphere at 800° C. for 90 seconds and then immersed in an aluminum-based plating bath containing 9% by weight of Si and 5% by weight of Mg and maintained at 600 to 680° C., to form an aluminum-based plated layer on the surface of the cold-rolled steel sheet. At this time, the temperature of the cold-rolled steel sheet immersed in the aluminum-based plating bath was controlled at a temperature of 15° C. or lower relative to the plating bath. Thereafter, cooling was carried out at a rate of 3° C./sec up to a temperature of 30° C. or lower, compared with the Mg—Si based alloy phase crystallization temperature of each component system, and carried out at a rate of 15° C./sec at a subsequent temperature.

Then, each of the produced plated steel sheets was cut to measure the composition, thickness and the like of the interfacial alloy layer, and the distribution of the Mg—Si based alloy phases thereof was observed. The results are shown in Tables 1 and 2, respectively. In this case, the composition of the interfacial alloy layer is an average value obtained by performing point analysis three times with SEM-EDS, and the thickness of the interfacial alloy layer is an average value measured three times in an optical microscope ×1000 magnification field of view.

Then, the plating performance and the corrosion resistance of each of the produced plated steel sheets were evaluated. Detailed evaluation methods and evaluation criteria are as follows. The results are shown in Table 2 below.

The plating performance was evaluated by measuring the degree of peeling of the plating layer by taping test of the bending outer sphere after the 0T bending test. The results of measurement were evaluated as ○ in the case of no plating peeling, as Δ in the case in which 5 to 10 area % of peeling occurred, and as X in the case of occurrence of peeling exceeding 10 area %.

Corrosion resistance of a processed part was evaluated by measuring corrosion loss after a processing material of drawbead was maintained for SST 480 hours. The results were as follows: ○ when no red rust was observed, Δ when the red rust occurrence area was 5% or less, and X when the red rust occurrence area exceeded 5%.

TABLE 1

| No. | Base Steel Sheet (weight %) Mn | Interfacial Alloy Layer Component Al | | | Plating Layer Thickness (μm) | Remarks |
| --- | --- | --- | --- | --- | --- | --- |
| | | Al | Mn | Si | | |
| 1 | 5 | 44 | 3.9 | 2.8 | 26 | Embodiment Example 1 |
| 2 | 15 | 58 | 7.7 | 9.5 | 35 | Embodiment Example 2 |
| 3 | 25 | 59 | 7.3 | 9.0 | 33 | Embodiment Example 3 |
| 4 | 2.5 | 44 | 2.8 | 10.3 | 28 | Comparative Example 1 |
| 5 | 40 | 68 | 9.6 | 10.2 | 26 | Comparative Example 2 |
| 6 | 15 | 62 | 6.4 | 9.5 | 34 | Comparative Example 3 |
| 7 | 15 | 58 | 7.3 | 5.4 | 31 | Comparative Example 4 |

TABLE 2

| | Mg—Si Based Alloy Phase | | | | | | Plating Performance | Corrosion Resistance of Processed part | Remarks |
| --- | --- | --- | --- | --- | --- | --- | --- | --- | --- |
| No. | a | b | c/d | e | f | hardness (Hv) | | | |
| 1 | 13 | 15 | 0.27 | 45 | 26 | 522 | ○ | ○ | Embodiment Example 1 |
| 2 | 11 | 13 | 0.22 | 34 | 13 | 524 | ○ | ○ | Embodiment Example 2 |
| 3 | 12 | 14 | 0.23 | 52 | 15 | 536 | ○ | ○ | Embodiment Example 3 |
| 4 | 14 | 14 | 1.3 | 50 | 6 | 385 | X | X | Comparative Example 1 |
| 5 | 9 | 47 | 0.9 | 180 | 27 | 620 | X | X | Comparative Example 2 |
| 6 | 11 | 58 | 0.76 | 225 | 18 | 557 | X | X | Comparative Example 3 |
| 7 | 17 | 19 | 0.58 | 192 | 12 | 483 | X | X | Comparative Example 4 |

Referring to Table 2, it can be seen that in Embodiment Examples 1 to 3, distribution of the Mg—Si based alloy phase is appropriately controlled, and the plating performance and the corrosion resistance on the processed part are significantly excellent. On the other hand, in Comparative Examples 1 to 4, which satisfied the main conditions according to an embodiment in the present disclosure, the distribution of the Mg—Si based alloy phase deviated from the control range according to an embodiment in the present disclosure, and the plating performance and the corrosion resistance of the processed part were poor.

Figure 2:
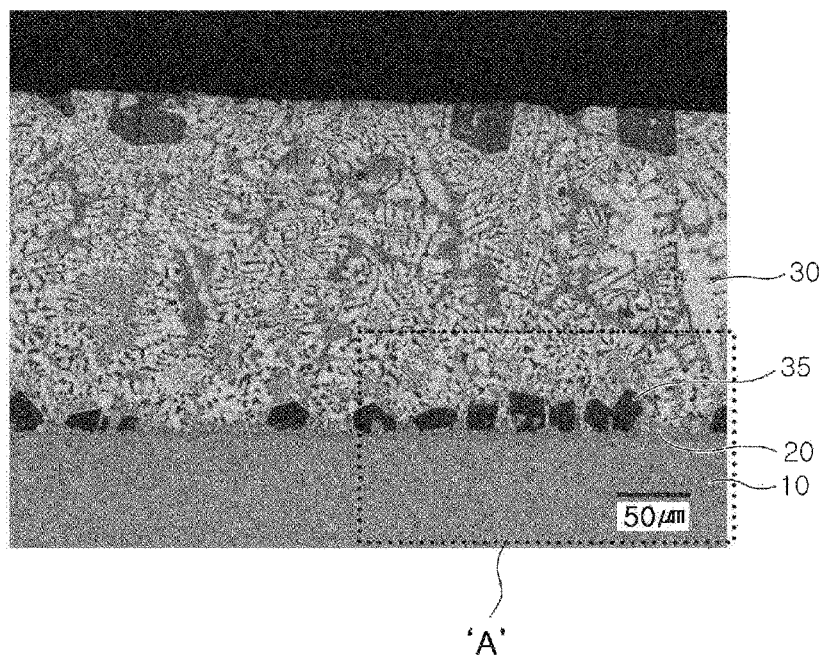
FIG. 2 is a scanning electron microscope (SEM) image of an aluminum-based alloy plated steel sheet of Embodiment Example 1 in the present disclosure.
Figure 3:
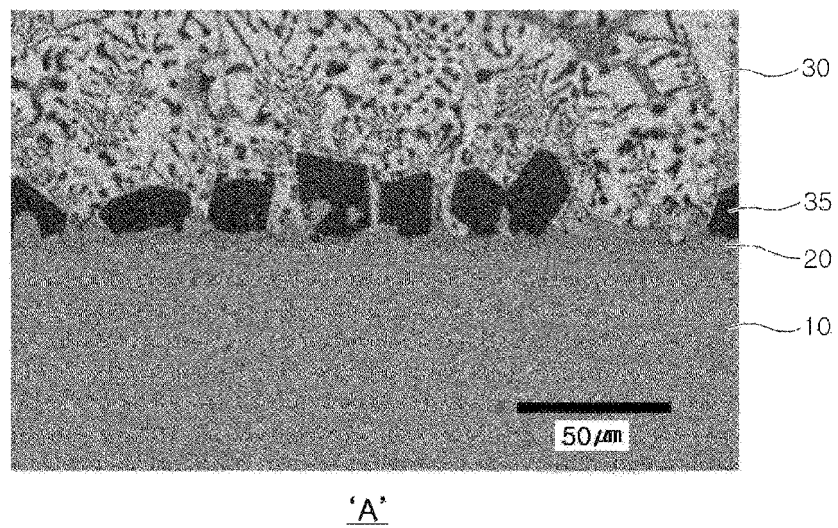
FIG. 3 is an SEM image illustrating an enlarged view of region A in FIG. 2.

FIG. 2 is a Scanning Electron Microscope (SEM) image of an aluminum-based alloy plated steel sheet according to Embodiment Example 1, and FIG. 3 is an SEM image illustrating an enlarged region A of FIG. 2. It can be confirmed that the main parameters according to an embodiment in the present disclosure are satisfied from the alloy phase distribution on the drawings.

While embodiments have been illustrated and described above, it will be apparent to those skilled in the art that modifications and variations could be made without departing from the scope of the present disclosure as defined by the appended claims.

The invention claimed is:

1. An aluminum-based alloy plated steel sheet, comprising:
   a base steel sheet;
   an interfacial alloy layer; and
   an aluminum-based plated layer comprising a magnesium-silicon (Mg—Si)-based alloy phase,
   wherein b/a is 1 to 5 when an area ratio of the Mg—Si based alloy phase contained in the aluminum-based plated layer is a and an area ratio of a Mg—Si based alloy phase contained in a region of a lower 20% of the aluminum-based plated layer in a thickness direction is b.

2. The aluminum-based alloy plated steel sheet of claim 1, wherein at least a portion of the Mg—Si based alloy phase is in contact with the interfacial alloy layer, and in Mg—Si based alloy phases in contact with the interfacial alloy layer, when a sum of lengths of the Mg—Si based alloy phases projected through an interface between the base steel sheet and the interfacial alloy layer is c and a length of an interface between the base steel sheet and the interfacial alloy layer is d, c/d is 0.2 to 0.8.

3. The aluminum-based alloy plated steel sheet of claim 2, wherein an average hardness of the Mg—Si based alloy phases in contact with the interfacial alloy layer is 400 to 600 Hv.

4. The aluminum-based alloy plated steel sheet of claim 2, wherein in the Mg—Si based alloy phases in contact with the interfacial alloy layer, when an average of lengths of the Mg—Si based alloy phases projected through an interface between the base steel sheet and the interfacial alloy layer is e and an average height of the Mg—Si based alloy phases in contact with the interfacial alloy layer is f, f/e is 0.2 to 3.

5. The aluminum-based alloy plated steel sheet of claim 2, wherein when an average interval of the Mg—Si based alloy phases in contact with the interfacial alloy layer is g and an average thickness of the aluminum-based plated layer is t, Equation 1: $t/5 \leq g \leq t$ is satisfied.

6. The aluminum-based alloy plated steel sheet of claim 1, wherein the base steel sheet comprises 5 to 35 wt % of Mn.

7. The aluminum-based alloy plated steel sheet of claim 1, wherein the interfacial alloy layer comprises, by weight %, 40 to 70% of aluminum (Al), 3 to 10% of manganese (Mn), 2 to 13% of silicon (Si), a remainder of iron (Fe), and unavoidable impurities.

8. The aluminum-based alloy plated steel sheet of claim 1, wherein the interfacial alloy layer has a thickness of 0.1 to 10 μm.

9. The aluminum-based alloy plated steel sheet of claim 1, wherein the aluminum-based plated layer comprises, by weight %, 3 to 15% of silicon (Si), 0.1 to 10% of magnesium (Mg), a remainder of aluminum (Al), and unavoidable impurities.

10. The aluminum-based alloy plated steel sheet of claim 9, wherein the aluminum-based plated layer further comprises, by weight %, one or more of 0.001 to 5% of calcium (Ca), 0.005 to 2% of strontium (Sr), 0.01 to 2% of manganese (Mn), 0.01 to 2% of chromium (Cr), 0.01 to 2% of molybdenum (Mo), and 0.1 to 10% of tin (Sn).

* * * * *